(12) United States Patent
Zhao

(10) Patent No.: US 6,466,664 B1
(45) Date of Patent: Oct. 15, 2002

(54) TIME SLOT BASED CALL PACING METHOD AND APPARATUS

(75) Inventor: Albert Z. Zhao, Toronto (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/455,559

(22) Filed: Dec. 6, 1999

(30) Foreign Application Priority Data

Dec. 16, 1998 (CA) .............................................. 2256119

(51) Int. Cl.[7] ................................................ H04M 3/00
(52) U.S. Cl. ................................ 379/266.08; 379/265.1
(58) Field of Search ........................ 379/265.1, 265.08, 379/266.07, 266.08, 309

(56) References Cited

U.S. PATENT DOCUMENTS

| | | | |
|---|---|---|---|
| 4,559,493 A | 12/1985 | Goldberg et al. ............ 324/681 |
| 4,829,563 A | 5/1989 | Crockett et al. ............. 379/309 |
| 4,881,261 A | 11/1989 | Oliphant et al. ........ 379/266.08 |
| 5,155,763 A | 10/1992 | Bigus ........................ 379/111 |
| 5,327,490 A | 7/1994 | Cave ...................... 379/266.01 |
| 5,341,412 A | 8/1994 | Ramot et al. ............. 379/92.03 |
| 5,467,391 A | 11/1995 | Donaghue et al. ..... 379/266.08 |
| 5,511,112 A | * 4/1996 | Szlam ......................... 379/162 |
| 5,546,456 A | * 8/1996 | Vilsoet et al. ......... 379/216.01 |
| 5,570,419 A | 10/1996 | Cave et al. ............ 379/266.08 |
| 5,640,445 A | 6/1997 | David ................... 379/112.01 |
| 5,926,528 A | * 7/1999 | David ................... 379/112.01 |

\* cited by examiner

Primary Examiner—Ahmad F. Matar
Assistant Examiner—Quynh Nguyen
(74) Attorney, Agent, or Firm—Jerry W. Herndon

(57) ABSTRACT

Pacing algorithms and their benefits in predictive dialers in call center activities have been appreciated for a number of years. A predictive dialer automatically dials new customers before the call center agents or attendants finish talking with their current customers. Pacing processes use predictive engines to estimate how many currently busy agents may become available within a given timeframe. Most existing predictive engines predict the agent availability in terms of yes/no decisions on an agent by agent basis. The inventive pacing algorithm is based upon mathematical probability models and provides more accuracy in the dialing of outgoing telephone calls from a call center by taking into account a multi-dimensional probabilistic model as is described.

12 Claims, 10 Drawing Sheets illustrates a flow diagram of the steps of the overall algorithm illustrates a flow diagram of the steps of the overall algorithm create Call Time Distribution (CTD), number of calls completed per time slot Case 1: If PT = 1 CTS

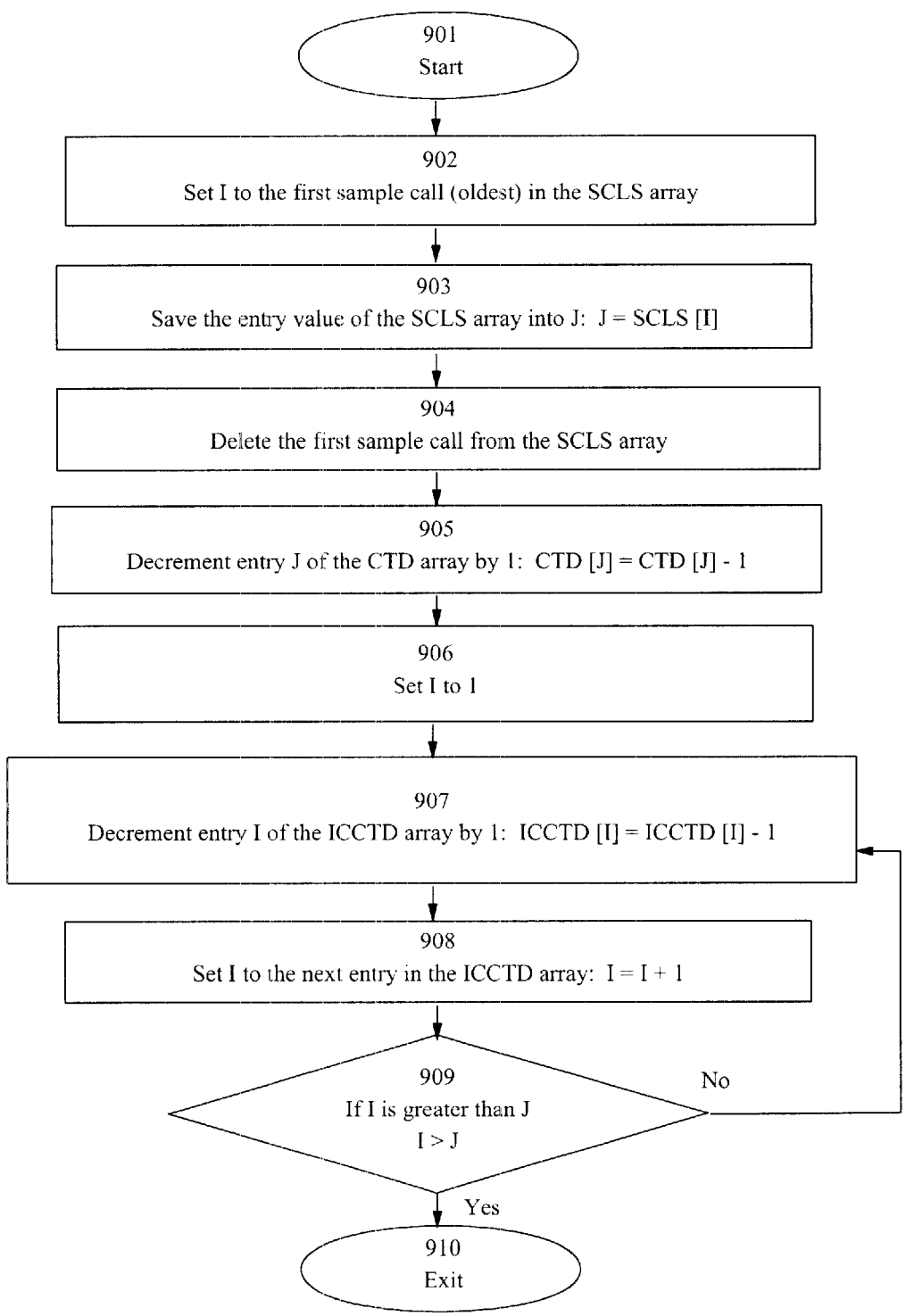

TIME SLOT BASED CALL PACING METHOD AND APPARATUS

FIELD OF THE INVENTION

The present invention relates to information handling technology and improvements therein. More particularly, the subject invention relates to a new pacing algorithm for application in predictive dialers for use in telephone call centre operations.

BACKGROUND OF THE INVENTION

The concept and evolution of pacing algorithms and the benefits that result from their use in predictive dialers in call centre activities have been appreciated for a number of years. Predictive dialers and pacing algorithms result in more efficient use of operators, agents or attendants, and more satisfied response from customers.

The functional integration of data processing systems with the information capabilities of telephone systems is becoming increasingly important in the enhancement and differentiation of today's business solutions. The synergy that is provided by marrying telephones with computers opens nearly unlimited opportunities for companies to dramatically enhance service to their networked call centres. Inbound customer inquiries can be handled with increased speed and accuracy, significantly boosting customer satisfaction. Outbound customer applications such as tele-sales or tele-marketing can deliver more streamlined campaigns and increase the contact rate between agents and customers which can substantially increase revenue generation.

The CallPath® family of products available from International Business Machines Corporation (IBM) enable applications to link the data processing power of a computer with the telephony processing capabilities of telephone systems. The primary focus of these products is on inbound and outbound tele-servicing and tele-marketing application opportunities. Frequently these applications are concentrated within business in special departments known as call centres. Some examples of applications that the CallPath family of products can provide are order processing, claims inquiry, stock broker services, telephone sales, market research, help desk and dispatch, fund raising, lead generation, qualification and tracking. The enabled applications allow business to improve customer service, increase revenues, reduce telephone bills, improve employee productivity and promote overall competitiveness. These CallPath products and services enable communications between a computer and a telephone system so that an application on the computer can control and access telephony information. A variety of telephone applications can be automated including simple and repetitive requests, data/caller coordination, call handling, data collection, and outbound dialing. A better understanding of the CallPath family of products can be obtained from the publication IBM® CallPath General Information, publication #GC31-8529-0, available from IBM Corporation.

Predictive dialing is a state of the art technology for call centres. A predictive dialer automatically dials new customers before the call centre agents or attendants finish talking with their current customers. In this way, the predictive dialer is able to connect the new customers to the agents immediately after the agents become available. The core of the predictive dialing technology is the pacing algorithm which directs the telephone dialer as to when and how many customer telephone numbers it should dial. This decision is typically based mainly on the estimation of the agent availability. In addition, dial/hit ratio, dial delay and many other factors will have effects on the outcomes. The predictive dialer is able to recognize when a called telephone is engaged and a busy signal is received, when an answering machine responds to the called number, and when after a period of time the call is not answered. For an overview of the concept of predictive dialers, reference may be made to the book entitled "Predictive Dialing Fundamentals-An Overview of Predictive Dialing Technologies, their Applications and Usage" by Aleksander Szlam and Ken Thatcher, Flatiron Publishing Inc., New York, copyright 1996 Melita International Corporation.

The pacing algorithm which is the subject of this application, is based upon mathematical probability models and provides more accuracy in the dialing of outgoing telephone calls from a call centre than the use of presently known pacing algorithms. None of the existing algorithms take into account the multi-dimensional aspect of the probabilistic model as subsequently described in this application. The use of this algorithm could eliminate or at least minimize annoying calls from both the customer and the attendant's point of view, when calls are made, and it is subsequently found that no one is at the other end of the connection.

The following references provide descriptions of representative examples of known prior art automated dialing systems and pacing algorithms employed therein:

U.S. Pat. No. 4,599,493 was granted Jul. 8, 1986 naming Ellis K. Cave as inventor, and is entitled "Multi-Line Telephone Control System". The subject matter provides for a continuous sequence of telephone calls made by an automated telephone calling system which are forwarded to a plurality of operators. Each call is made to a designated telephone number and is dialed in sequence by a controller, and the line condition of the called number is detected. For each line that is answered, it is connected by the communication device to a non-occupied operator. A status message is sent to the host computer indicating the answered number and the operator involved, and relevant data is displayed to the operator by the computer. All of the designated telephone numbers are dialed in sequence and made available to operators, depending on the number of operators available and the number of customers who are waiting on hold.

U.S. Pat. No. 4,881,261 issued to Oliphant et al on Nov. 14, 1989, and is entitled "Method for Predictive Pacing of Calls in a Calling System". A predictive pacing algorithm instructs a dialer to place calls based upon the management of three categories of calls, namely, calls in the process of being set up, calls in a queue waiting for an available agent, and calls connected to an agent. The pacing algorithm attempts to keep the total number of these categories of calls equal to a constant value. As the size of the agent group changes, the pacing of the predictive dialer is adjusted.

U.S. Pat. No. 4,829,563 entitled "Method for Predictive Dialing", issued to Crockett et al on May 9, 1989, and describes a predictive dialing system based upon a prediction of the number of operators expected to be available at the end of a time interval and of the number of calls expected to be completed during this time interval. The predicted number of calls is then determined by a weighting factor which is controlled by variations in the percentage of unattended calls and variations in the average operator idle time between calls. The system dynamically adjusts the number of calls dialed based upon a comparison of these factors.

U.S. Pat. No. 5,155,763 issued to Bigus et al on Oct. 13, 1992 and is assigned to International Business Machines Corporation. This patent, entitled "Look Ahead Method and Apparatus for Predictive Dialing Using a Neural Network", describes a computer system connected to a telephone switch that stores a group of call records including a number of factors pertaining to previous calls and other factors; these factors include the number of pending calls, the number of available operators, the average idle time, the completion rate, and nuisance call rate. These call records are analyzed by a neural network to determine a relationship between input parameters and the dial action stored in each call record. After this relationship is determined, the computer system sends a current group of input parameters to the neural network and based on the analysis of the previous call records, the neural network determines whether a call should be initiated or not.

U.S. Pat. No. 5,327,490 issued to Ellis K. Cave on Jul. 5, 1994 and relates to a "System and Method for Controlling Call Placement Rate for Telephone Communication Systems". A call pacing system is described in which outbound calls are automatically paced so that an attendant becomes available as a valid call is completed. Two primary factors are determined to assess when a new call is to be dialed, consisting of how long the agent will talk, and how long and how many calls it will take to get a live answer when a call is placed. Once the call placing algorithm is aware of these two average times, it then calculates how long to wait after the agent has started talking before starting to place calls to get a connection to the next customer.

U.S. Pat. No. 5,341,412 issued to Ramot et al on Aug. 23, 1994 and is entitled "Apparatus and a Method for Predictive Call Dialing". This patent describes automated dialing systems using a predictive dialing system where telephone numbers are dialed under the control of one or more computers. Each agent has access to full telephone keypad functionality and a computer workstation. The system provides for optimal call scheduling with two alternative methods for responding to calls which are completed before an agent is available. The administrator can select to either terminate these calls or have a recording played until an agent becomes available.

U.S. Pat. No. 5,467,391 entitled "Integrated Intelligent Call Blending", issued to Norman J. Donaghue et al on Nov. 14, 1995, pertains to a telephone call servicing operation in which agents can be transferred from dealing with inbound calls to outbound calls or vice versa, depending upon workload and various factors. Agents are transferred from inbound call servicing to outbound call servicing when the agent response indicator is below a predetermined threshold. In this way agent's time is effectively utilized.

U.S. Pat. No. 5,570,419 issued to Cave et al on Oct. 29, 1996 and is directed to a "System and Method for an Improved Predictive Dialer". A goal-based automatic call placing system is described which allows a supervisor to establish target values for particular telephone call parameters such as agent utilization, drop rate or hold time, and then adjust the length of the call pacing delay for the dialing of new calls in order to reach the target values.

U.S. Pat. No. 5,640,445 issued to John E. David on Jun. 17, 1997 and is directed to an "Outbound Call Pacing Method Which Statistically Matches the Number of Calls Dialed to the Number of Available Operators". As the dialing process begins, the system controls the number of calls being made at any one time, based on the number of operators that are available to receive the calls and the maximum allowable abandoned call rate. A weight is assigned each agent engaged in a call or in wrap-up work, which is a function of how long an agent has been engaged in a call or in the wrap-up work, the length of adjustable time windows, and the maximum allowable abandoned call rate. The sum of these weights is a predicted number of engaged agents that will become free. This, then, is one of the factors that is used to determine the number of calls to be dialed.

Pacing processes use predictive engines to estimate how many currently busy agents may become available within a given timeframe. Most existing predictive engines including those referred to in the prior art above, such as the standard deviation based engines, predict the agent availability in terms of yes/no decisions on an agent by agent basis. These yes/no estimations are not additive and therefore have to be used by the pacing process each individually. This approach does not fit very well with the real call centre situation where the availability of the agents as a whole is more essential than the availability of each individual agent. Furthermore, yes/no decisions are very broad or coarse, where only two values are available, especially when the decisions must be made in isolation. These results are also subjective since the line between a yes/no decision can be blurred and is usually arrived at somewhat artificially. It is therefore concluded that a new approach to pacing algorithms for use in predictive dialers is required.

SUMMARY OF THE INVENTION

It is one object of the present invention to provide a new pacing algorithm for use in predictive dialers for use in call centre applications.

It is another object of the invention to provide a pacing algorithm which is based on mathematical probability models resulting in a more efficient dialing of customers along with a minimization of the attendant's idle time.

It is a further object of the invention to provide new predictive dialer methods and apparatus embodying the pacing algorithm described herein.

According to one aspect of the invention, there is provided a call pacing method for predicting the number of active telephone call connections at a call centre that will be terminated in defined time segments within a time period, comprising the steps of creating a call time distribution array of calls consisting of the number of telephone call connections that are terminated during each of a number of equal time segments, creating an inverse cumulative call time distribution array of calls consisting of the cumulative number of telephone call connections that are yet to be terminated for each of a number of equal time segments, creating a predictive reference vector by dividing each entry of the call time distribution array with the corresponding time segment entry of the inverse cumulative call time distribution array, determining the value of the predictive reference vector of a current total active call state, and calculating the most likely number of said active telephone call connections to terminate within the period of time for each time segment using the predictive reference vector and the value of the predictive reference vector of the current total active call state.

According to another aspect of the invention there is provided apparatus for implementing a call pacing method for predicting the number of active telephone call connections at a call centre that will be terminated in defined time segments within a time period, comprising means for creating a call time distribution array of calls consisting of the number of telephone call connections that are terminated during each of a number of equal time segments, means for creating an inverse cumulative call time distribution array of calls consisting of the cumulative number of telephone call connections that are yet to be terminated for each of a number of equal time segments, means for creating a predictive reference vector by dividing each entry of the call time distribution array with the corresponding time segment entry of the inverse cumulative call time distribution array, means for determining the value of the predictive reference vector of a current total active call state, and means for calculating the most likely number of said active telephone call connections to terminate within the period of time for each time segment using the predictive reference vector and the value of the predictive reference vector of the current total active call state.

BRIEF DESCRIPTION OF THE DRAWINGS

The foregoing and other objects, aspects and advantages of the invention will be better understood from the following detailed description of a preferred embodiment of the invention which is illustrated by way of examples and not of limitations, with reference to the accompanying drawings, in which:

FIG. 9 is a flow diagram illustrating the deletion of the oldest sample call from the call array.

DETAILED DESCRIPTION OF THE PREFERRED EMBODIMENT

Figure 1:
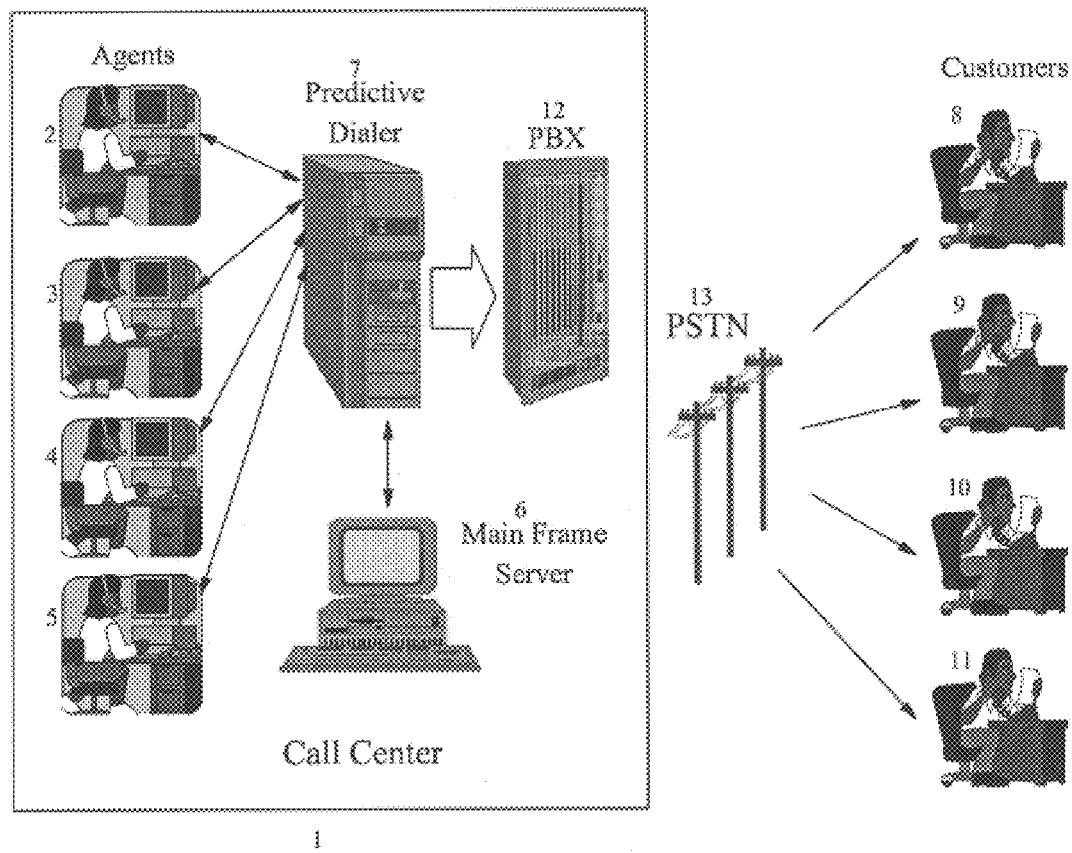
FIG. 1 illustrates in diagrammatic form a general call centre environment and its main functional components.

An overview of a typical call centre environment will now be described with reference to FIG. 1 of the drawings. It is considered that a brief description of a call centre is sufficient since the use of call centres is becoming increasingly well known and many descriptions are available, including those provided in the aforementioned prior art documents.

Modern day call centres exploit network computing technology by combining the functioning of data computer systems and voice telephone systems. With reference to FIG. 1, a call centre, generally shown by reference numeral 1, serves a plurality of agents 2, 3, 4 and 5 who are each provided with a telephone set or other appropriate means for connecting to the commercial telephone system and a client workstation including a computer display terminal and an input device such as a keyboard or mouse.

The computer workstations and telephone devices are connected to a mainframe computer or server 6 and telephone switch 12 via predictive dialer 7. Server 6 selectively provides pre-accumulated information and data to be displayed on the agent workstations including details about customers whose telephone sets will be connected to those of the agents, as will be subsequently described. The main component of the automatic dialing system is predictive dialer 7. Predictive dialer 7 is also coordinated by server 6 which provides instructions as to the telephone numbers to be dialed for connection to customers shown as 8, 9, 10 and 11. The telephone numbers dialed by the predictive dialer 7 control the telephone switch system or PBX 12 for connection via the public switch telephone network (PSTN) 13 to customers' telephone sets. When a customer (one of 8 to 11) responds to its ringing telephone by answering the call, it is intended that one of the agents (2 to 5) will be available to communicate with the customer and the agent will simultaneously have on his or her workstation display screen all of the necessary information pertaining to that customer so as to meaningfully deal with the intended business at hand. It is thus desirable to be able to connect a customer with an agent within a short period of time after the customer answers the telephone call so as to make efficient use of the agent's time and not upset the customer through unnecessary waiting.

Various workstations, mainframe computer and telephone switching devices along with their operating systems and programs such as the IBM CallPath family of programs previously described, can be used to carry out the functioning of a call centre as is well known to those skilled in the art.

As for some details of an actual operational call centre environment, the client workstations could be any appropriate IBM personal computer, the server or mainframe computer could be an IBM personal computer or an AS/400® computing system, for example. The operating system for the client server could be OS/2®, Windows® or OS/400®, as appropriate, and the aforementioned IBM CallPath family of products could provide the functional and application programming, including that for the predictive dialer. A compatible telephone switch supported by the CallPath products could be provided by any one of a variety of suppliers of telephone equipment.

Of course it is intended that the aforementioned description of a call centre environment is by way of example and illustration only. In an actual environment the details provided including the number of agents and customers could vary and be significantly different from what is shown.

A pacing algorithm is used in a predictive dialer in a call centre environment to predict or forecast the number of telephone calls between agents and customers that will be terminated during a period of time. This is significant so that a particular number of new calls may be initiated by the predictive dialer to clients and customers and the number of calling agents or attendants at the call centre who are free will be efficiently occupied with answered calls with no undue waiting on the part of the clients called or the calling agents.

The novel pacing algorithm disclosed in this application for use in a predictive dialer predicts the fate or termination of active calls using call time distributions and inverse cumulative call time distributions, based on historical data of calls. The algorithm deals with the overall group of telephone calls and attendants or agents, and not individual details of either. The novel pacing algorithm makes use of accumulated data pertaining to actual or typical telephone calls in a tele-marketing activity at a call centre. Details of these telephone calls are recorded and include sample calls from the oldest call to the youngest call and have an associated length of call time for each call indicated in the sample. This is data accumulated for a sample of actual telephone calls. This distribution array could be changing continuously as new calls are added to the sample and old calls are deleted. Such a distribution shows the range of time periods for termination of calls in the sample, that is calls in the sample vs. call length of time distribution.

The disclosed inventive approach establishes a hype-plane model or N-dimensional plane model where N is the number of time slots. This model divides all calls into n groups dynamically based on their current call time and then calculates the group availability in terms of the number of agents. These estimations are additive and therefore the total availability of all agents can be derived from these sub-estimations of the agent groups. The entire approach can be represented by a hype-plane which is a linear expression of n variables with each variable representing the group probability. This approach has been found to provide a better and more sound estimation for predicting the availability of agents and thereby predicting the number of calls that should be dialed in a call centre than conventional approaches.

In a typical call centre operation, there are two time phases that agents go through when dealing with customers. The first is the talk time or the length of time that an agent is actually communicating with a customer and the telephone connection is actually in place. The second is the wrap-up time which is the length of time that an agent must devote after termination of the call to do housekeeping activities such as recording data from the call or making particular notes pertaining to the customer situation. These are the factors that are commonly used by most predictive engines available today to predict the agent availability. For the purpose of the description for the present invention, call time will be interpreted as including both the talk time and the wrap-up time for each call. However, it is appreciated that the description could proceed based on either the wrap-up time or the talk time if there is no wrap-up time. The intended scope of the invention is not limited to talk time, wrap-up time or call time but covers any one of these situations.

Figure 2:
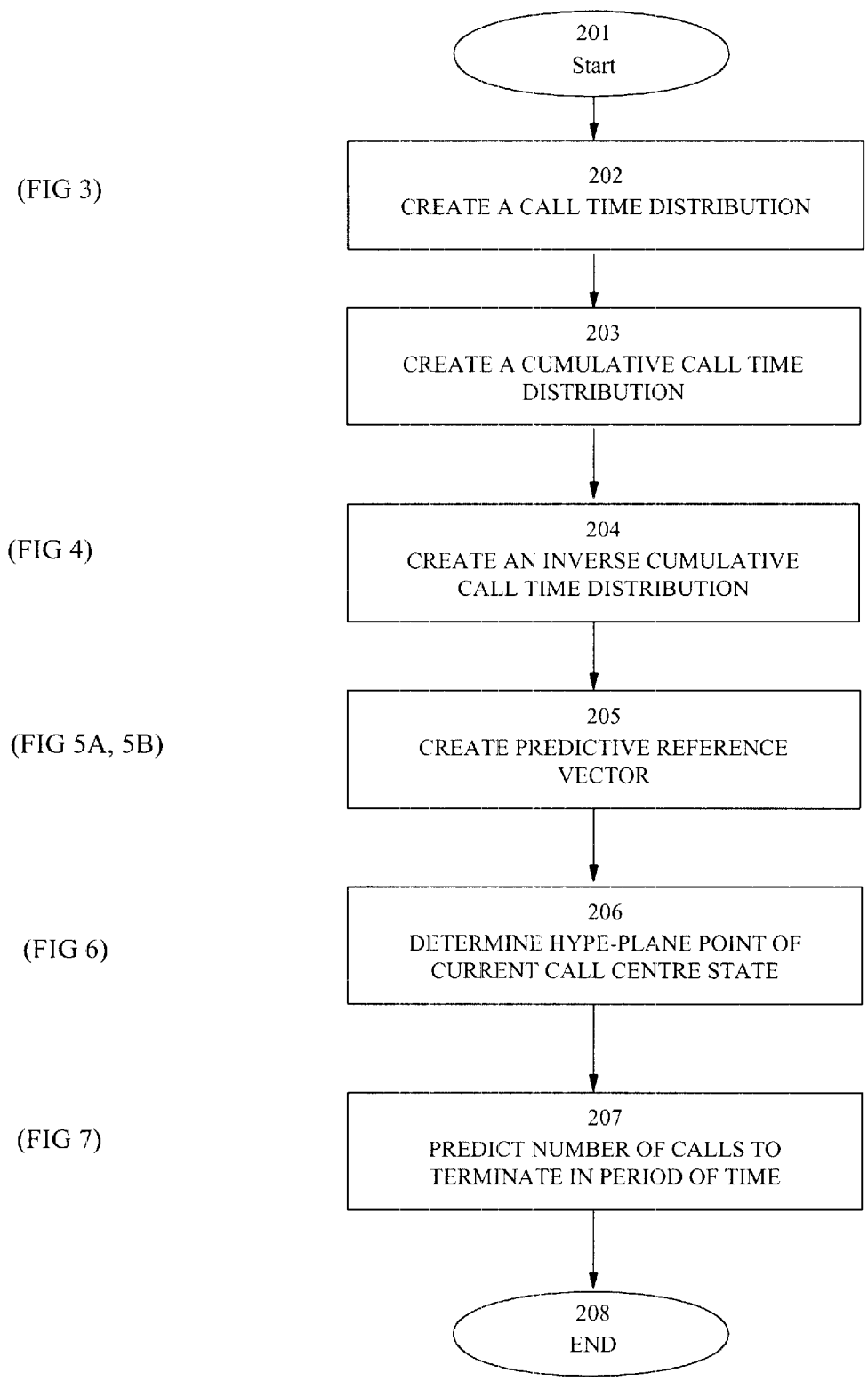
FIG. 2 is a flow diagram illustrating the steps of the overall pacing algorithm and how the subsequent figures of the drawings relate to more details of these various steps.

FIG. 2 is a flow diagram illustrating the various steps of the overall algorithm of the subject invention. The algorithm is shown starting at 201 and the first step 202 is to create a call time distribution. This is, in effect, a distribution of telephone calls showing the number of calls that terminate and are wrapped up during each of the time slots. Step 202 is described in more detail in FIG. 3. The next step, 203, is the creation of a cumulative call time distribution which represents the number of calls that terminate in less than or prior to the corresponding call time slots. Step 204 is the creation of an inverse cumulative call time distribution which represents the number of calls that have not yet terminated for each of the cumulative time periods. This is described in more detail in FIG. 4. Step 205 refers to the creation of the predictive reference vector and two examples in FIGS. 5A and 5B are provided for achieving this. Step 206 refers to the determination of the hype-plane point of the current active call state of all agents and is discussed in more detail with reference to FIG. 6. Finally, step 207 results in the prediction of the number of calls to be terminated in each period of time and is described in more detail with reference to FIG. 7. These number of calls to be terminated can be translated into the number of new calls that can be connected and which can be accommodated by agents who are available. Of the number of calls placed by the predictive dialer to customer telephone numbers, only a portion will actually be connected and answered by a customer which is reflective of the call hit ratio. The algorithm then ends as shown at 208.

Figure 3:
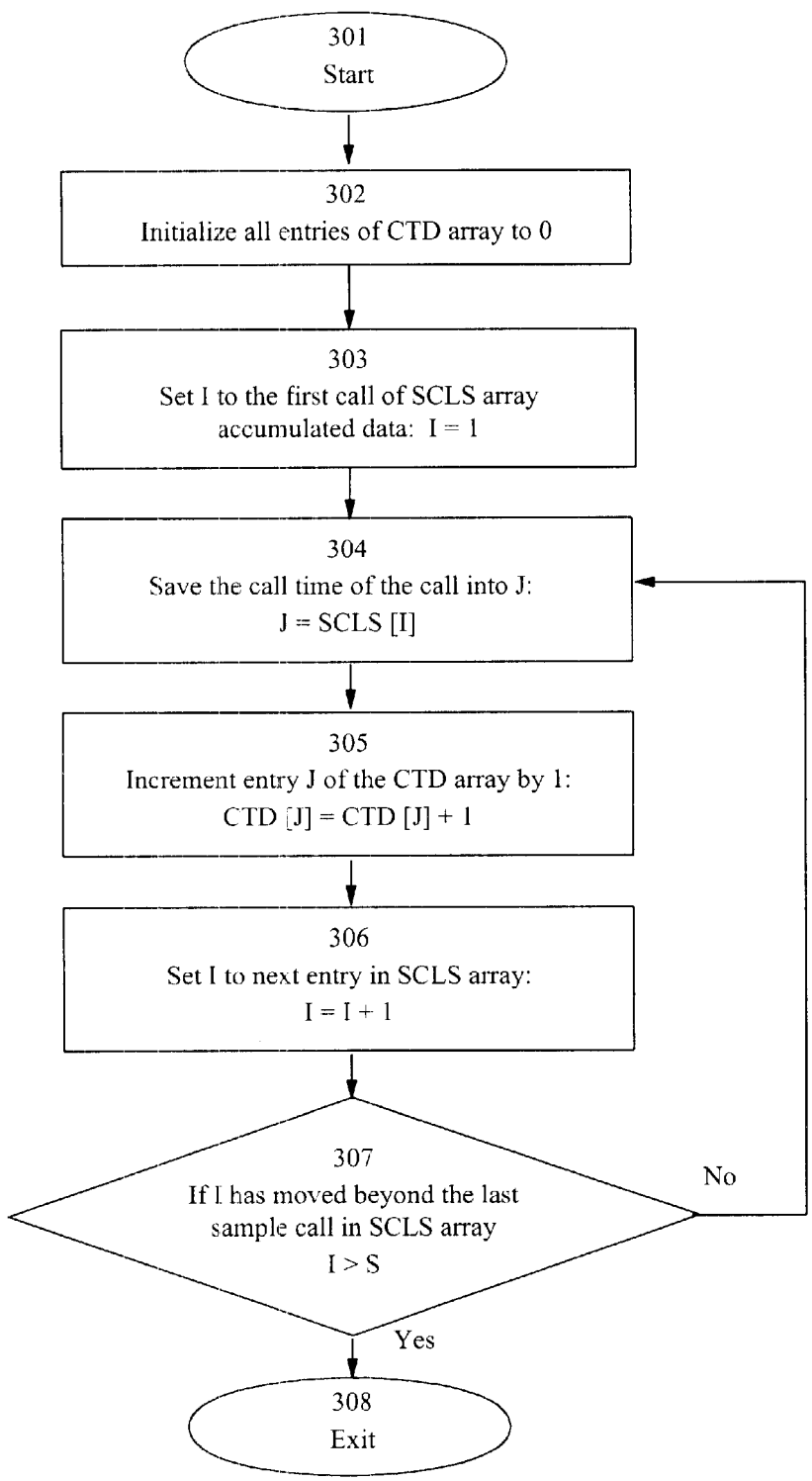
FIG. 3 is a flow diagram to create a call time distribution of calls that will be terminated in each time slot.

FIG. 3 is a flow chart illustrating the creation of a call time distribution (CTD) of calls or the number of calls completed in each time slot where the time slot number indicates the duration of those calls or the average call connection time. It is apparent that for any group of telephone calls there are going to be a range of when these calls are terminated or disconnected. Thus, it is desirable to create a distribution based on time slots or equal periods of time and indicating the associated number of calls that are terminated or that are wrapped up or that have associated call times that fall within each of these time slots. After starting this routine at step 301, the variables including the call time distribution are set to zero at step 302. Step 303 then starts the process by assessing the first call of all of the calls in the sample call life span (SCLS). The SCLS resulted from the accumulation of historical call data as previously mentioned. Step 304 then saves the value of the call time of the first call which is represented as J time slot. Step 305 then increments the call time distribution at J time slot by 1 and at step 306 the counter I is incremented to the next call entry of the sample call life span. Decision step 307 causes the routine to exit if the variable I increases past the total number of sample call(s), S, or returns to step 304 to provide for the remaining number of sample calls. This routine thus continues until all of the calls in the sample call life span have been accounted for and their corresponding call time lengths in terms of time slots have been reflected in the call time distribution. As an example, if we assume that each call time slot is ten seconds long, then the routine of FIG. 3 would provide for the number of calls of the call sample life span that take less than ten seconds to wrap up, the number of calls taking equal to or longer than ten seconds to wrap up but less than twenty seconds, and so on. The maximum call time length involved would be N times ten seconds in this example, where N is the number of time slots.

Figure 4:
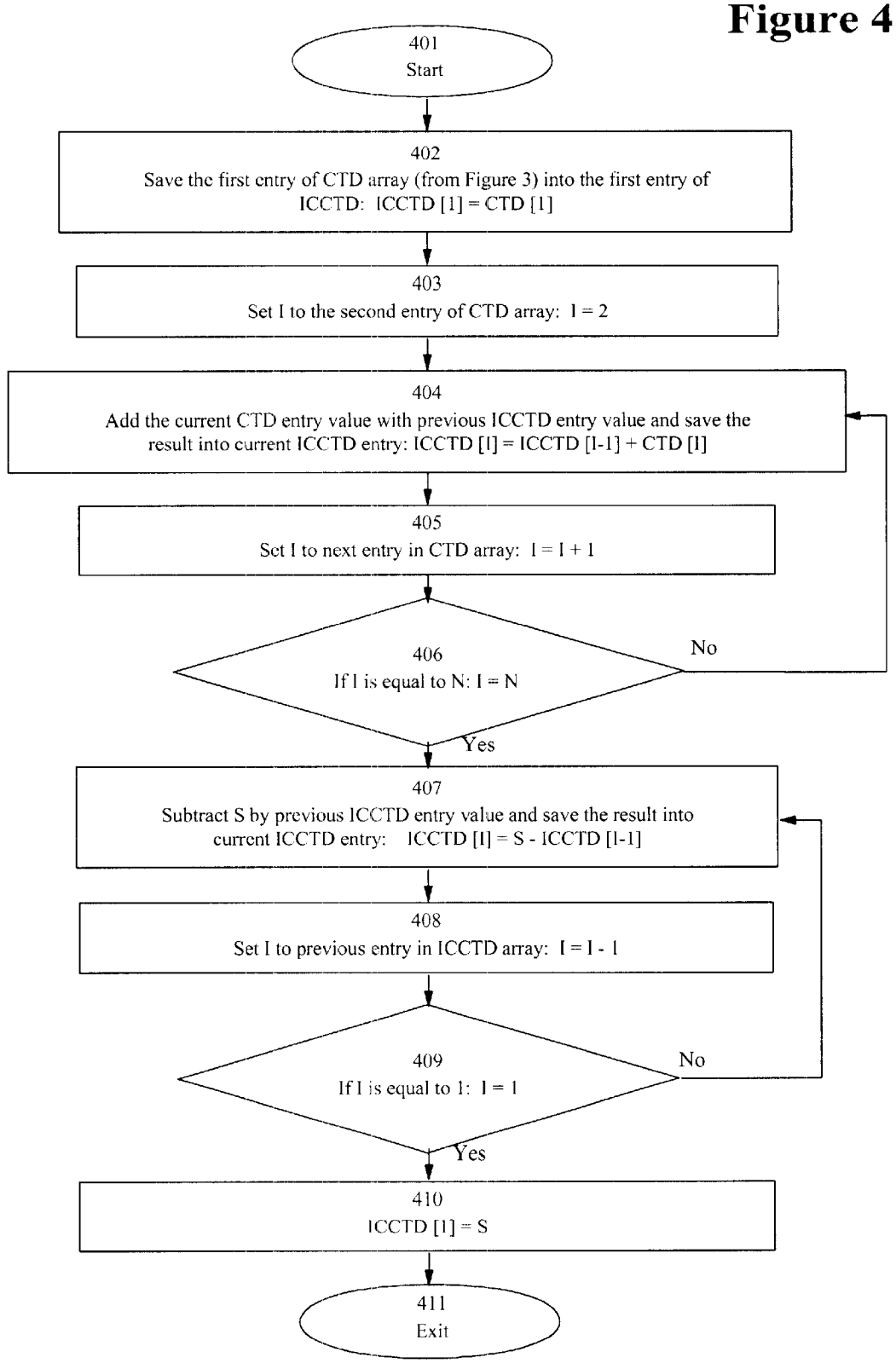
FIG. 4 is a flow diagram to create an inverse cumulative call time distribution of the calls in FIG. 3.
Figure 5A:
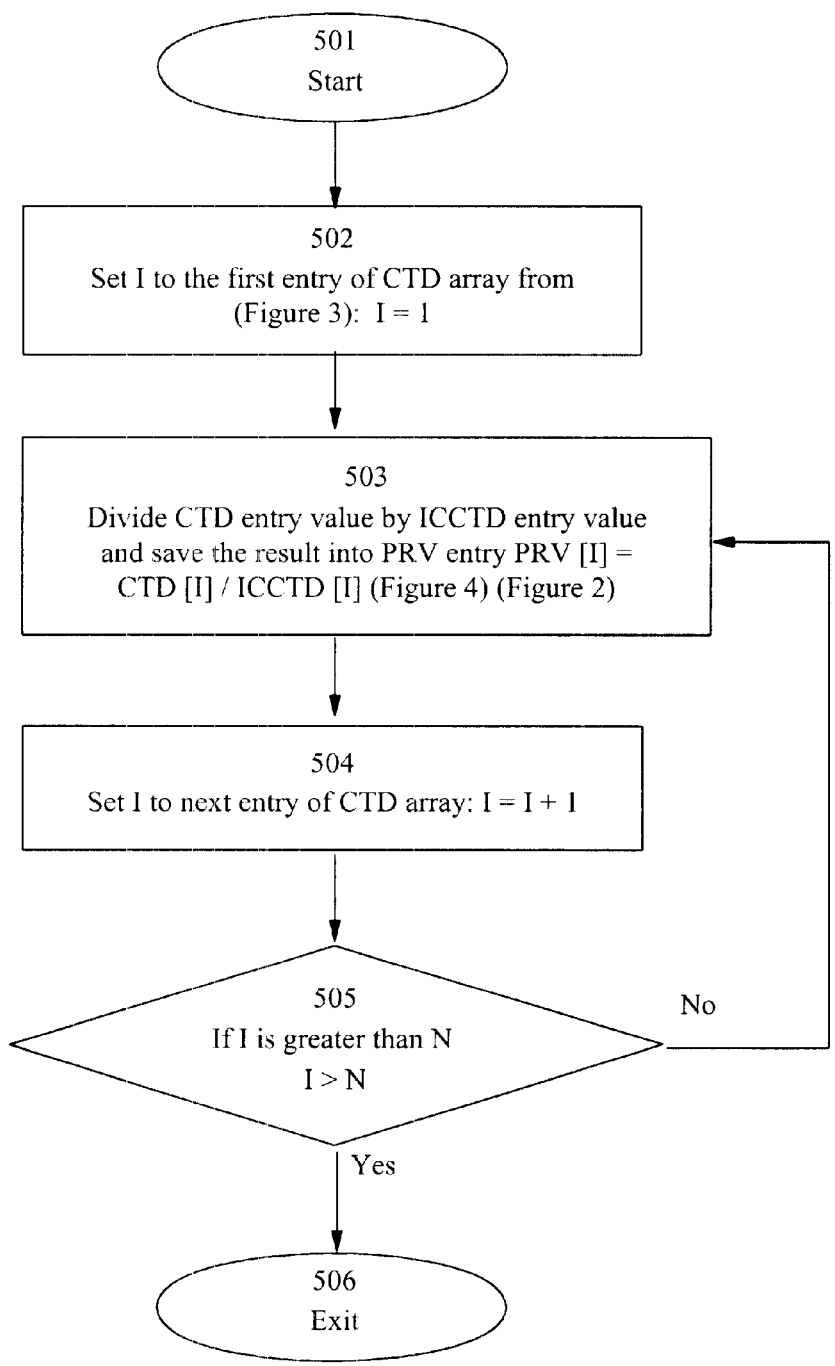
FIG. 5A is a flow diagram to create a first version of a predictive reference vector.
Figure 5B:
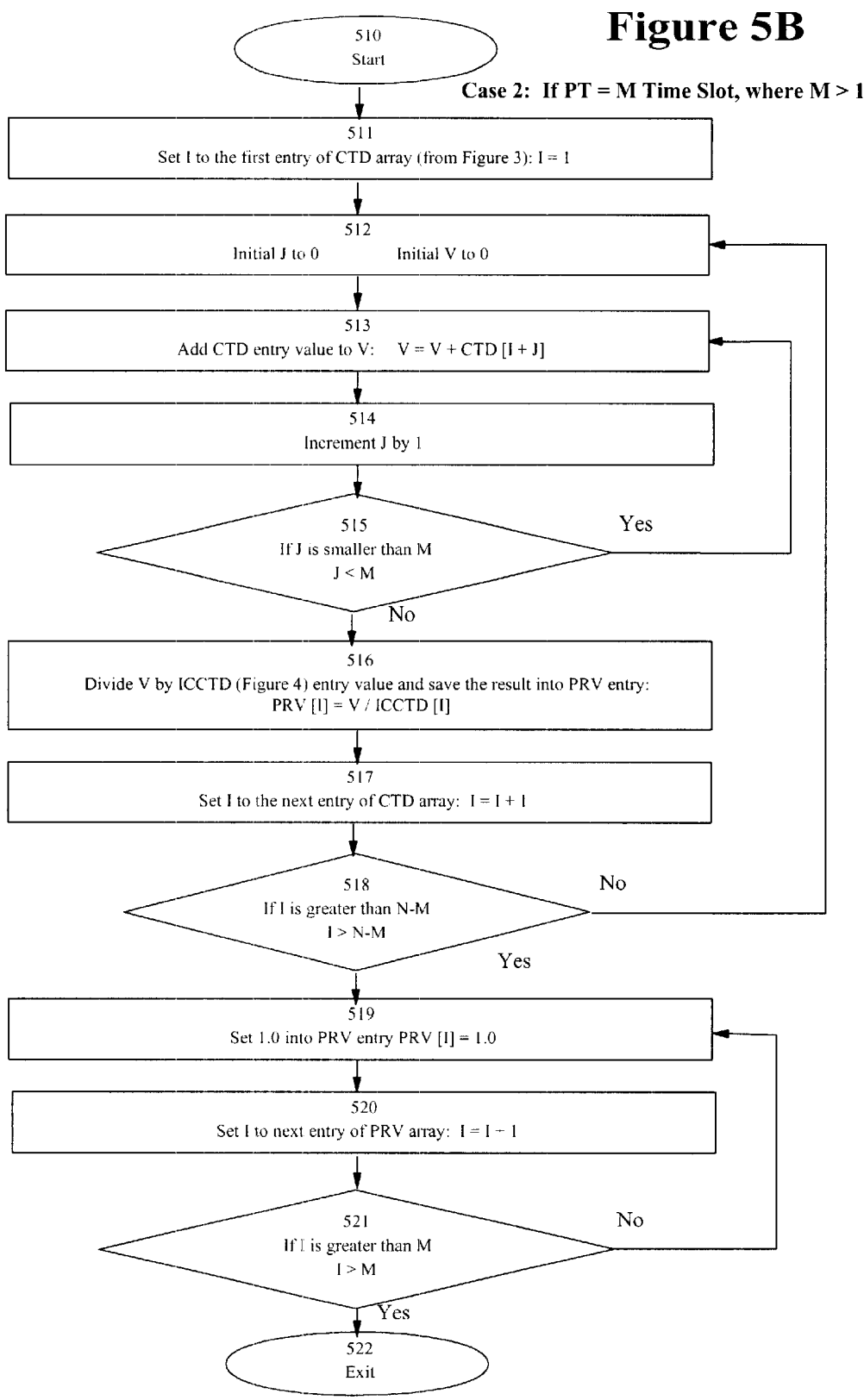
FIG. 5B is a flow diagram to create a second version of a predictive reference vector.

The flow chart of FIG. 4 illustrates a routine for the creation of an inverse cumulative call time distribution (ICCTD) array. In other words, the routine of FIG. 4 results in distribution of the calls of the call sample life span that have not yet terminated at defined time slots. The routine is shown starting at 401 and at step 402, the calls in the first time slot of the call time distribution of FIG. 3 are equated to the calls in the inverse cumulative call time distribution (ICCTD) for the first time slot. Step 403 then moves counter I to 2. Step 404 adds the value of the array of the call time distribution (CTD) for the current time slot I to the value of the inverse cumulative call time distribution (ICCTD) array entry I–1 and saves the result as the inverse cumulative call time distribution array entry I, the current time slot. Step 405 then increments the counter I and the decision at step 406 if I is not equal to or greater than N, which is the total number of time slots, then the routine returns to 404 to create a new current value of the inverse call time distribution array. In step 406, once the value of counter I is equal to N, the number of time slots, in step 407 of the routine the previous value of the inverse call time distribution is subtracted from S which is the total number of calls in sample call life span (SCLS), to create a current inverse cumulative call time distribution. In step 408, the counter I is decreased by 1. Decision step 409 causes the previously described steps 407 and 408 to be repeated until the counter I is equal to 1. The result is then an inverse cumulative call time distribution (ICCTD) array where S is the number of call samples and the routine is then terminated as shown by step 411.

Continuing from the previous illustrative example provided for FIG. 3, if each call time slot is considered to be ten seconds long, then each of the numbers in the inverse cumulative call time distribution would be such that the first number would represent calls that take equal to or greater than zero seconds to terminate, which in effect is the total size S of the number of call samples. The next number in the array represents the number of calls taking equal to or greater than ten seconds to terminate, and so on. The result is a distribution of the number of calls that have not terminated before the corresponding call time slots, that is calls that are still going on at the beginning of a particular time slot.

With references to FIGS. 5A and 5B, the predictive reference vector can be created. With both call time and inverse cumulative call time distribution arrays resulting from the use of the routines as described in FIGS. 3 and 4 respectively, the likelihood of an active call to terminate within a certain period of time can then be calculated. Two types of calls are being dealt with in this analysis—the sample calls which are the historical calls that were used to establish the call time and inverse cumulative call time distribution arrays, and active calls which are the current calls which are in progress. The goal is to predict the fate of the active calls using both of the call time and inverse cumulative call time distribution arrays created based on the historical data.

This prediction can be based on two parameters—the active call age of a call, which is the length of time that a call has already been in progress, and the prediction timeframe length. The length of the prediction timeframe is the selected prediction precision to be used. Considering the call centre as a whole, the number of active calls that may terminate within ten seconds, that is a prediction timeframe of ten seconds, will be much smaller than the number of calls that may terminate within 120 seconds, where the prediction timeframe is 120 seconds. Therefore, if we were to make a prediction, the number of agents that would become available in ten seconds would be much smaller than the number of agents that would become available in 120 seconds. As for the prediction timeframe length, the length of each time slot should be proportional to the maximum call time and disproportional to the number of agents. That is, the shorter the maximum call time and the larger the number of agents, the smaller each time slot may be and the more accurate the prediction.

As an example, let us assume that the duration of an active call is five time slots long and the timeframe used for a prediction is one time slot long. We know from FIG. 3 the number of calls which terminated in the fifth time slot and from FIG. 4 the total number of calls that take five time slots or longer to terminate. Therefore, the likelihood of an active call that is currently in the fifth time slot to terminate inside the fifth time slot is the ratio of these two values or the conditional probability. This likelihood is referred to as the timeframe based termination probability.

The above process is illustrated by the routine of FIG. 5A which is a flow chart dealing with creating the predictive reference vector where N is the total number of call time slots. The predictive reference vector is in essence a list of the probabilities of termination of the calls for each of the time slots. After starting at step 501, step 502 sets the variable I to the first time slot and step 503 then divides the respective values of the array for the call time distribution by the corresponding array for the inverse cumulative call time distribution. The counter I is then incremented at step 504 and the process continues as shown at step 505 until the counter I is greater than N which is the total number of call time slots. The routine then stops.

Similarly, the timeframe based termination probability can be calculated for an active call of certain active age where the timeframe used for prediction is longer than one time slot. As an example, let us assume that the timeframe is equal to three time slots and we want to calculate the timeframe based termination probability for a call with an age equal to four time slots. From the routine of FIG. 3, we know the total number of calls that terminate in the fourth time slot, the fifth time slot and the sixth time slot. Similarly, from the routine of FIG. 4, we know the total number of calls that take more than four time slots or longer to terminate. Therefore, the timeframe based termination probability for the active call is equal to the total calls of the first three mentioned time slots divided by the total calls which represents the conditional probability. As shown in the flow chart of FIG. 5B, to provide for the situation where the timeframe is greater than one time slot, after starting at step 510, the counter I for the first call time distribution array is set equal to one in step 511. At step 512 other variables are initialized. Step 513 creates a cumulative value V for the various call time slot entries where J varies from one, as shown in step 514, to less than the value of the timeframe length (M) as shown at step 515. This accumulated value of the number of calls for the time slots is then divided by the appropriate value of the inverse cumulative call time array to create the first value of the predictive reference vector (PRV), as shown at step 516. At step 517, the counter of the call time distribution array is then increased and at step 518 the counter is compared to the total number of call time slots N less the value of M, the number of call time slots under consideration. Steps 519 and 520 provide for a range of predictive reference vectors and at step 521. Once the variable is greater than M, the routine is stopped at step 522.

To achieve finer prediction, the prediction timeframe may be required to be shorter than one time slot. In this case, we may either reduce the size of the time slot if the average call duration is short and the number of agents is sufficient. Or we can assume that within each time slot the number of calls to terminate is evenly distributed so that linear adjustment can be applied and the same solution as described above can be used.

Thus in general, for each time slot a ratio is created of the number of calls that terminate in the time slot and the number of calls that are yet to be terminated. This provides the likelihood or probability for calls to terminate. The predictive reference vector is the range of these probabilities for all of the time slots.

The timeframe based termination probability is additive in the following sense. If we were to assume a number of active calls all having the same active call age, and their timeframe based termination probability is P, the most likely number of calls that are going to terminate within the timeframe can be calculated as being the integer of the number resulting from the product of the number of calls and the probability for their time slot. Here, the individual call termination probability is in fact the probability that the agent will become available and the most likely number of calls that are going to terminate within the predictive timeframe length is, in fact, the agent group availability. The latter value is more stable and accurate than the former and may be used for call centre prediction purposes.

Figure 6:
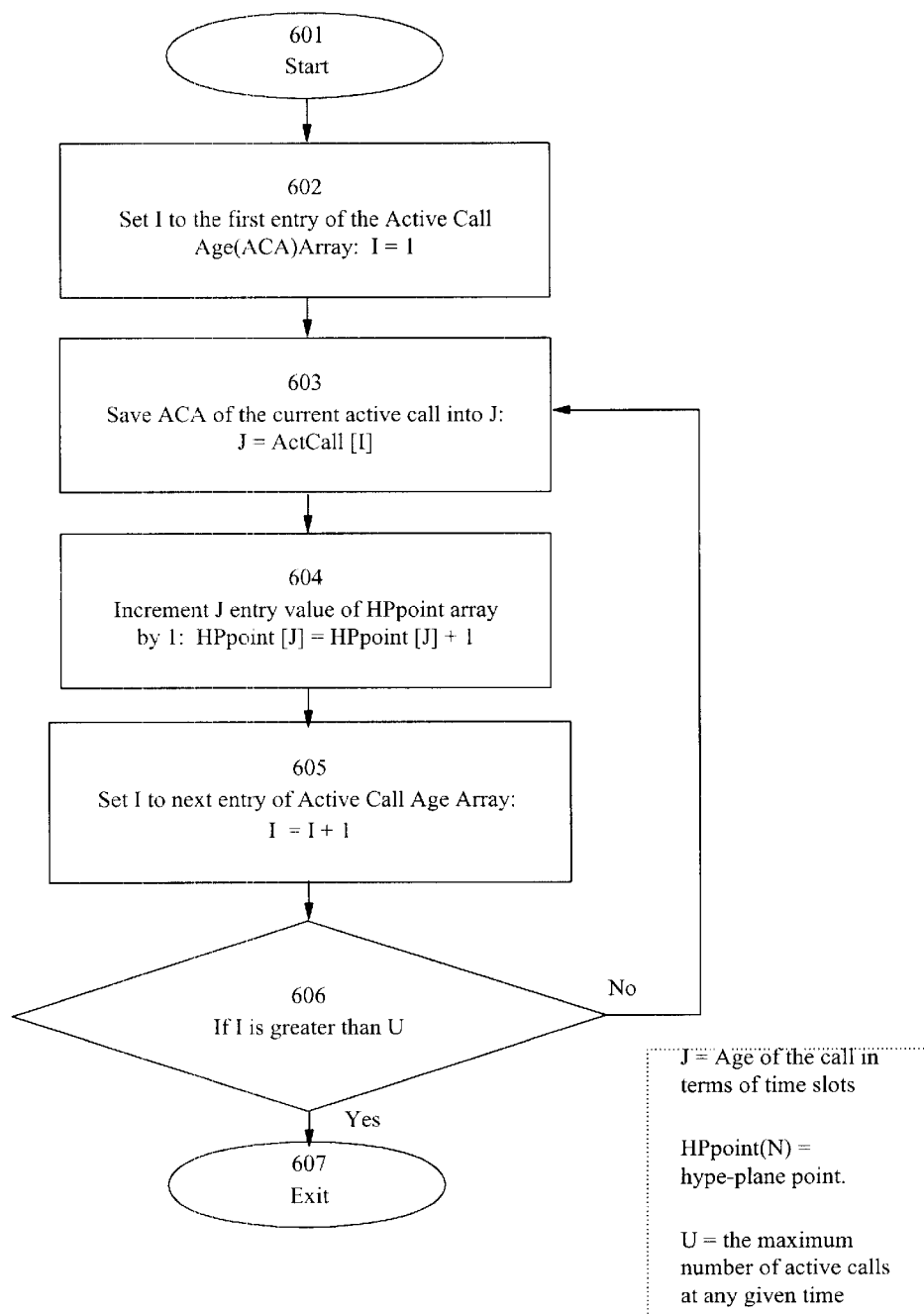
FIG. 6 is a flow diagram to find the point on the hypeplane (or N-dimension plane) for a current total active call state.

Referring to FIG. 6 which is the routine to find the point on the hype-plane for the current total call state, an active call age array contains the duration of the active calls, or in other words the time slots containing all current active calls. A call state is the duration of a call. Total call state is the distribution of the durations of all current calls. Each total call state can be thought of as a point on the hype-plane and it is the value of the point that this routine of FIG. 6 determines. In effect, the agents are grouped into groups using the time slot based on the duration of their current conversation with customers. Agents move from one group to the next when their call time exceeds the duration of the current time slot. Their probabilities to terminate are also changed when their call time moves from one time slot to the next. The agents leave the groups when they finish the current call and become available and go back to the first time slot when they accept new calls.

After the routine of FIG. 6 is started at 601, the counter I is set to the first entry of the active call age array at step 602. At step 603 the entry I value is saved into variable J, which is the age, in terms of time slots, of the I active call. Each dimension of the hype-plane is a time slot. Since we have N time slots, we need an N dimension hype-plane to represent all possible total active call states. HPpoint is an array of N entries with each entry representing the number of active calls in a specific time slot. Once we save the time slot for a call in variable J, it is used to increment the J entry of the HPpoint by one in step 604. At step 605, the next active call, i.e. I+1, is entered into the active call age array. If I becomes greater than the number of active calls U in the decision 606, the routine exits at 607, otherwise the routine is repeated from step 603.

Figure 7:
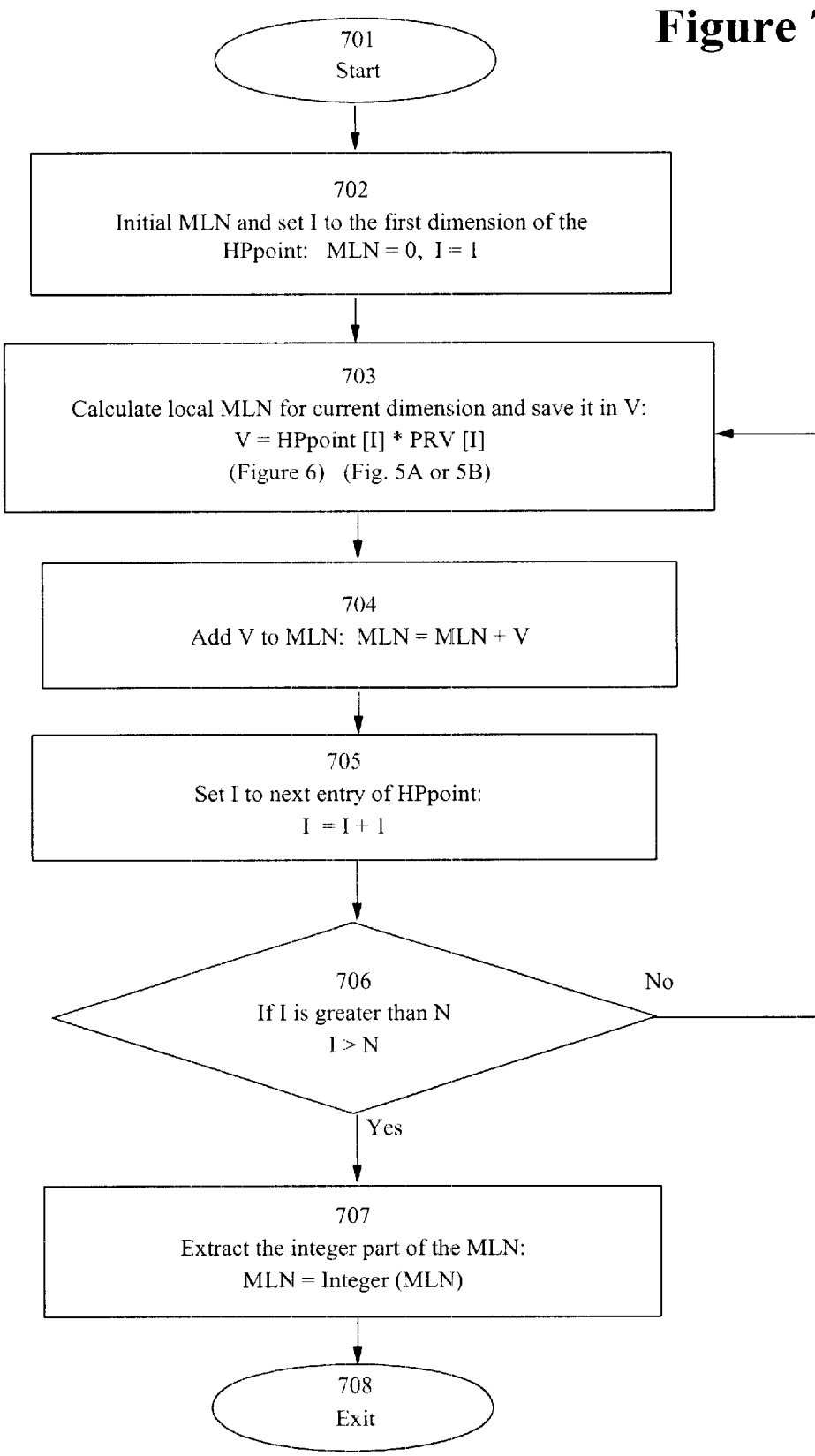
FIG. 7 is a flow diagram to create the most likely number of active calls to terminate within the prediction timeframe length.

Continuing with reference to FIG. 7, which provides a routine for calculating the most likely number of total active calls to terminate within the prediction timeframe. In effect, the result indicates the number of agents or attendants that will be free or available to handle the additional calls that can be placed to new clients to replace the predicted number of calls that will be terminated in the defined period of time. This greatly assists in the dial pacing activity. Thus it is desirable to determine the most likely number (MLN) of total active calls to terminate within the prediction timeframe (PT). After the start of the routine at step 701, step 702 initializes the variables. At step 703 a value is calculated for each time slot which is the product of the value of the hype-plane point and the value of the predictive reference vector for that time slot. This value, which is the most likely number of calls in that time slot to terminate, is then added to the most likely number of all time slots in step 704. This iteration is continued through steps 705 and 706 until the variable I is greater than the number of the time slots. At step 707 the integer or integral value of the resulting number is determined and this represents the most likely number of active calls to terminate within the prediction timeframe. The routine ends at step 708. As has been noted, the individual call termination probability is also the agent available probability and the most likely number for all time slots is the availability of all agents.

In the discussion of the method and algorithm so far, we have essentially assumed that the number of calls and the call time distribution array and the resulting inverse cumulative call time distribution array are static. However, in reality, the state of a call centre is constantly changing depending upon the time of day, the customer demography and other factors. Thus, call time and inverse cumulative call time distribution are usually dynamic as opposed to being static. These distributions can be made dynamic by updating the call time distribution array and the inverse cumulative call time distribution array to take into account new calls and to remove old calls for the sample universe continuously. This results in the need to re-calculate the distributions accordingly. The rate of increasing or decreasing or taking in or taking out sample calls can be either the same or different. When the rates are the same the size of the sample universe will not change. However when the rates are different, the size of the sample universe will vary from time to time. To keep track of the sample calls, a sample call life span array can be created which represents the call time of call samples, ordered from the oldest sample call to the youngest sample call. A new sample call will always be added one at a time and be put at the end of the array so that the added call becomes the new youngest call and its call time will be used to update both the call time array and the inverted cumulative call time distribution arrays.

Figure 8:
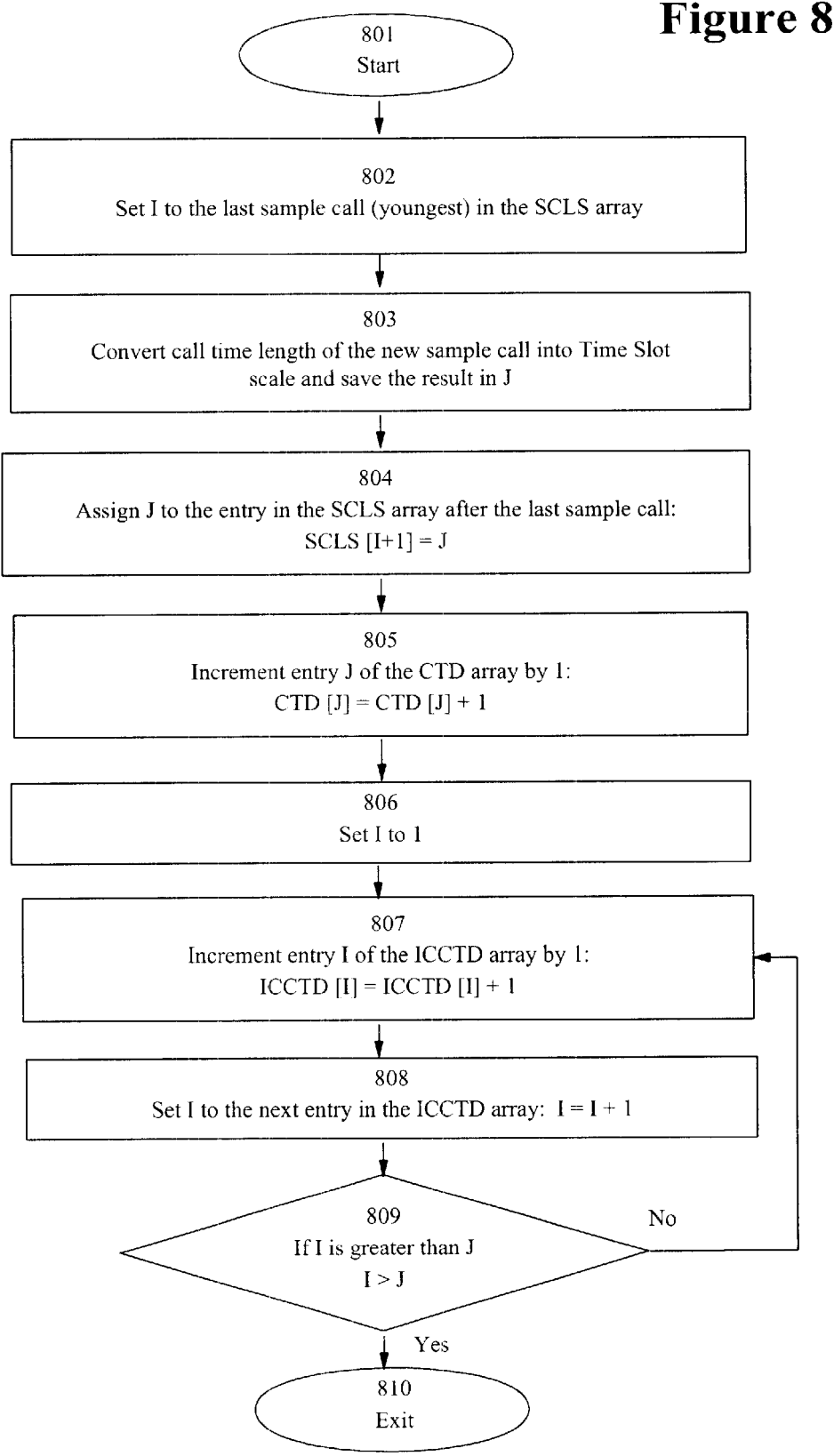
FIG. 8 is a flow diagram illustrating the addition of a new sample call to the call array.

With reference to FIG. 8 which represents a routine to add a new sample call to the array, after starting at step 801 the counter I is set to the youngest call in the sample call life span array in step 802. In step 803 the call time length of the new sample call is converted into the scale of the time slot and the result is saved. In step 804 the resultant value is added to the array after the last sample call. The call time distribution array is then incremented by one in step 805 and counter I is set to one at step 806. The inverse cumulative call time distribution is incremented at step 807 with the counter being incremented at 808. This latter process continues until the value of I is greater than J as shown at step 809, and then the routine stops at step 810. The output of this routine is thus an updated sample call life span (SCLS) array, an updated call time distribution (CTD) array, and an updated inverse cumulative call time distribution (ICCTD) array.

Sample calls will always be deleted one at a time starting from the oldest call. To delete a sample call from the sample universe, the first step is to delete the first call from the front of the sample call life span array. In reference to FIG. 9 which is a routine for deleting the oldest sample call, after starting the routine at 901, the counter I is set to the oldest call in the sample call life span array in step 902 and this call is identified in step 903. This is the call that is then deleted in step 904 and the values of the call time distribution are appropriately revised in step 905. After initializing counter I in step 906, in step 907 the value of the inverse cumulative call time distribution array is changed. All of the values are reiterated in steps 908 and 909 until the variable I is greater than J and the routine is stopped at step 910. The output of this routine is then an updated sample call life span (SCLS) array, an updated call time distribution (CTD) array, and an updated inverse call time distribution (ICCTD) array.

Having described the inventive call pacing algorithm and method in some detail along with the various flow diagrams, it is believed that all aspects of the pacing algorithm and method can be readily implemented and automated in various ways by those skilled in the art, by various methods and apparatus including a programmed computer system.

Having thus described a preferred embodiment of the invention, it should be readily understood that the foregoing is only illustrative of the invention. Various alternatives and modifications can be devised by those skilled in the art without departing from the spirit of the invention. Accordingly, the present invention is intended to embrace all such alternatives, modifications and variations which fall within the scope of the appended claims.

What is claimed:

1. A call pacing method for predicting the number of active telephone call connections at a call center that will be terminated in defined time segments within a time period comprising the steps of:

creating a call time distribution array of calls consisting of the number of telephone call connections that are terminated during each of a number of equal time segments;

creating an inverse cumulative call time distribution array of calls consisting of the cumulative number of telephone call connections that are yet to be terminated for each of a number of equal time segments;

creating a predictive reference vector by dividing each entry of the call time distribution array with the corresponding time segment entry of the inverse cumulative call time distribution array;

determining the value of the predictive reference vector of a current total active call state; and calculating the most likely number of said active telephone call connections to terminate within the defined period of time for each time segment using the predictive reference vector and the value of the predictive reference vector of the current total active call state.

2. The call pacing method of claim 1, wherein said step of creating an inverse cumulative call time distribution array includes the steps of:

creating a cumulative call time distribution array by accumulating for each time segment the number of calls that have terminated in each time segment up to and including each time segment; and subtracting from the total number of calls each entry of the cumulative call time distribution array for each time segment.

3. The call pacing method of claim 1 or 2 wherein said step of determining the value of the predictive reference vector of the current total active call state includes determining the number of active calls for each time segment that have not yet terminated.

4. The call pacing method of claim 1 or 2 wherein said step of calculating the most likely number of said active telephone call connections to terminate within the defined period of time for each time segment includes for each time segment multiplying the value of the predictive reference vector and the value of the predictive reference vector for a current time segment and adding the result to the multiplied product for the previous time segment and extracting the integer of the resulting value.

5. The call pacing method of claim 4 further including predicting the number of agents at the call center that will become available in said time period and thus the number of new telephone calls that could be placed and handled by the unoccupied agents at the call center based on the calculation of the integer for most likely number of active calls to terminate in said period of time.

6. The call pacing method of claim 1 or 2 including the step of updating the number of calls reflected in the call time distribution array and inverse call time distribution array by removing calls from the total number of calls that have terminated from the call center and creating new call time distribution and inverse call time distribution arrays.

7. The call pacing method of claim 1 or 2 including the step of updating the number of calls reflected in the call time distribution array and inverse call time distribution array by adding new calls to the total number of calls that have been connected at the call centre and creating new call time distribution and inverse call time distribution arrays.

8. Apparatus for implementing a call pacing method for predicting the number of active telephone call connections at a call center that will be terminated in defined time segments within a time period comprising:

means for creating a call time distribution array of calls consisting of the number of telephone call connections that are terminated during each of a number of equal time segments;

means for creating an inverse cumulative call time distribution array of calls consisting of the cumulative number of telephone call connections that are yet to be terminated for each of a number of equal time segments;

means for creating a predictive reference vector by dividing each entry of the call time distribution array with the corresponding time segment entry of the inverse cumulative call time distribution array;

means for determining the value of the predictive reference vector of a current total active call state; and means for calculating the most likely number of said active telephone call connections to terminate within the period of time for each time segment using the predictive reference vector and the value of the predictive reference vector of the current total active call state.

9. The apparatus for implementing a call pacing method as in claim 8 wherein said means for creating an inverse cumulative call time distribution array includes:

means for creating a cumulative call time distribution array by accumulating for each time segment the number of calls that have terminated in each time segment up to and including each time segment; and means for subtracting from the total number of calls each entry of the cumulative call time distribution array for each time segment.

10. The apparatus for implementing a call pacing method as in claim 9 including:

means for predicting the number of agents at the call center that will become available in said time period and thus the number of new telephone calls that can be placed and handled by the unoccupied agents at the call center based on the calculation of the integer for most likely number of active calls to terminate in said period of time.

11. The apparatus for implementing a call pacing method as in claim 8, 9 or 10 including means for updating the number of calls reflected in the call time distribution array and inverse call time distribution array by removing calls from the total number of calls that have terminated at the call center and creating new call time distribution and inverse call time distribution arrays.

12. The apparatus for implementing a call pacing method as in claim 8, 9 or 10 including means for updating the number of calls reflected in the call time distribution array and inverse call time distribution array by adding new calls to the total number of calls that have been connected at the he call center and creating new call time distribution and inverse call time distribution arrays.

* * * * *